US011316406B2

(12) United States Patent
Zahradsky et al.

(10) Patent No.: US 11,316,406 B2
(45) Date of Patent: Apr. 26, 2022

(54) ELECTRICAL ROTATING MACHINE WITH IMPROVED COOLING

(71) Applicant: MOTEURS LEROY-SOMER, Angouleme (FR)

(72) Inventors: Vit Zahradsky, Hanusovice (CZ); Matthieu Boirlaud, Saint-Yrieix (FR)

(73) Assignee: MOTEURS LEROY-SOMER, Angouleme (FR)

( * ) Notice: Subject to any disclaimer, the term of this patent is extended or adjusted under 35 U.S.C. 154(b) by 203 days.

(21) Appl. No.: 15/746,930

(22) PCT Filed: Jul. 19, 2016

(86) PCT No.: PCT/EP2016/067176
§ 371 (c)(1),
(2) Date: Jan. 23, 2018

(87) PCT Pub. No.: WO2017/016932
PCT Pub. Date: Feb. 2, 2017

(65) Prior Publication Data
US 2019/0341829 A1    Nov. 7, 2019

(30) Foreign Application Priority Data

Jul. 24, 2015  (FR) ...................................... 1557105

(51) Int. Cl.
*H02K 9/00* (2006.01)
*H02K 7/00* (2006.01)
*H02K 9/06* (2006.01)

(52) U.S. Cl.
CPC .............. *H02K 9/00* (2013.01); *H02K 7/006* (2013.01); *H02K 9/06* (2013.01)

(58) Field of Classification Search
CPC .......... H02K 9/005; H02K 7/006; H02K 9/06
USPC ......................................................... 310/61
See application file for complete search history.

(56) References Cited

U.S. PATENT DOCUMENTS

| 2,494,200 | A |   | 1/1950 | Ramqvist |            |
|-----------|---|---|--------|----------|------------|
| 3,383,529 | A | * | 5/1968 | Baumann  | H02K 9/14  |
|           |   |   |        |          | 310/52     |
| 4,182,966 | A | * | 1/1980 | Mishra   | H02K 1/20  |
|           |   |   |        |          | 310/269    |
| 4,270,064 | A | * | 5/1981 | Glandorf | H02K 9/20  |
|           |   |   |        |          | 184/104.1  |

(Continued)

FOREIGN PATENT DOCUMENTS

CN    101971462 A      2/2011
DE      8212393 U1 *   8/1982
(Continued)

OTHER PUBLICATIONS

Translation of Foreign document No. FR 10879 (Year: 1909).*
(Continued)

*Primary Examiner* — Alex W Mok
(74) *Attorney, Agent, or Firm* — Shumaker, Loop & Kendrick, LLP

(57) ABSTRACT

A rotor of an electrical rotating machine having poles formed from stacks of magnetic plates and electrical conductors wound around each pole. The rotor includes cooling fins extending in prolongation of the poles along the axis of rotation of the rotor.

17 Claims, 2 Drawing Sheets

(56) References Cited

U.S. PATENT DOCUMENTS

| | | | | |
|---|---|---|---|---|
| 5,306,972 | A | * | 4/1994 | Hokanson .............. H02K 9/02 310/58 |
| 5,757,094 | A | * | 5/1998 | van Duyn .............. H02K 1/32 310/157 |
| 7,186,156 | B2 | * | 3/2007 | Le Flem .............. B63H 5/125 440/6 |
| 8,487,490 | B2 | * | 7/2013 | Dutau .............. H02K 9/14 310/63 |
| 2003/0011257 | A1 | * | 1/2003 | Akemakou .......... H02K 21/042 310/91 |
| 2007/0295568 | A1 | * | 12/2007 | Vasilescu .............. H02K 1/32 188/267 |
| 2008/0150400 | A1 | | 6/2008 | Crowell |
| 2011/0001372 | A1 | * | 1/2011 | Dutau .............. H02K 1/32 310/65 |
| 2013/0342052 | A1 | * | 12/2013 | Turnbull .............. H02K 9/22 310/64 |
| 2015/0028727 | A1 | * | 1/2015 | Watanabe .............. H02K 9/06 310/60 A |

FOREIGN PATENT DOCUMENTS

| | | |
|---|---|---|
| DE | 8212393 U1 | 8/1982 |
| FR | 10879 E | 10/1909 |
| FR | 2103261 A7 | 4/1972 |
| FR | 2940867 A1 | 7/2010 |
| JP | S5538232 Y1 | 9/1980 |
| JP | 57111068 U * | 7/1982 |
| JP | S57111068 U | 7/1982 |
| JP | 2001037134 A | 2/2001 |
| WO | 2005062444 A1 | 7/2005 |
| WO | 2010018334 A2 | 2/2010 |

OTHER PUBLICATIONS

Office Action for CN App. No. 201680043519.5 dated Apr. 22, 2019 (and English translation) (15 pages.).

International Search Report with English Translation for PCT/EP2016/067176 dated Sep. 12, 2016 (7 pages).

* cited by examiner

ELECTRICAL ROTATING MACHINE WITH IMPROVED COOLING

TECHNICAL FIELD AND BACKGROUND

The present invention relates to electrical rotating machines.

The invention is more particularly, but not exclusively, concerned with the cooling of open electrical rotating machines, which may be single-phase or multiphase.

The expression "open electrical rotating machine" denotes a machine cooled by a flow of air taken from outside the machine.

The invention relates more particularly to the cooling of machines in which the rotor comprises windings with winding heads and parts of windings parallel to the axis of rotation of the machine, also called "straight parts", held by clamping chocks.

Various improvements have already been proposed to increase the cooling efficiency of such machines, notably in patent application FR2940867.

Utility model DE G 8212393 discloses a wound rotor having fins of constant width fastened to the poles by an applied part.

SUMMARY

The invention is intended to provide further improvements to electrical rotating machines and achieves this by means of an electrical rotating machine comprising a rotor and a stator, cooled by an air flow created by means of at least one fan, which may be driven by the main shaft of the machine or by its own drive system, and comprising poles formed from stacks of magnetic plates and electrical conductors wound around each pole, the rotor comprising cooling fins extending in prolongation of the poles along the axis of rotation of the rotor.

The invention enables the rotation of the rotor to be used to cool the stator, the cooling fins generating an air flow which is mainly projected in the radial direction toward the stator windings.

The invention enables the stator cooling efficiency to be increased.

Each fin may be fastened to a guard plate or to a corresponding stack of plates, and/or to heads of windings wound on these poles, or by means of an intermediate part acting as a mechanical link between the fin and the rest of the machine.

The expression "winding heads" is taken to mean the parts of the rotor windings that extend outside the magnetic circuit of the rotor, notably the parts of the windings that extend from one winding aperture to another.

The fins may each be held by means of an implement used during the winding of the rotor.

The winding heads of the rotor may have electrical conductors that are spaced apart, forming passages between them that contribute to the ventilation of the winding heads. The implement that is used to keep the conductors spaced apart may be used to fasten the fins to the rotor.

The electrical rotating machine may comprise a stator, and a rotor as defined above. The stator may have winding heads, and the cooling fins preferably extend axially at a distance from the stator winding heads, the length of a fin preferably being between 0% and 150% of the length of a winding head.

The radial dimension of the fins preferably increases with distance from the corresponding pole. The fins may have a radially inner edge parallel to the axis of rotation and a radially outer edge extending radially outward as its distance from the corresponding pole increases. The distance between the radially outer edge and the enveloping surface of the winding heads of the facing stator may be variable or substantially constant.

It is advantageous for the width of the fins to be variable, as this enables one of their edges to be brought as close as possible to the stator winding head, thus cooling the latter more effectively.

Preferably, the fins are fastened directly to the stack of rotor plates, or to a conductive rod which also acts as a damper in electrical terms, or to the rotor winding, or to a bracket. This allows savings of materials to be made.

It is advantageous for the outermost diameter of the fins to form the largest outside diameter of the rotor. This may improve the stator cooling efficiency.

The fins may be flat or not flat.

The machine may comprise a radial fan. This fan may also be a mixed flow or axial fan.

The machine is preferably an alternator.

The fins may be positioned on only one side, or on each side, of the main pole piece, an arrangement that may improve the operating efficiency of the machine.

BRIEF DESCRIPTION OF THE DRAWINGS

The invention may be more readily understood from a perusal of the following detailed description of non-limiting examples of embodiment thereof, and from an examination of the attached drawing, in which.

DETAILED DESCRIPTION

Figure 1:
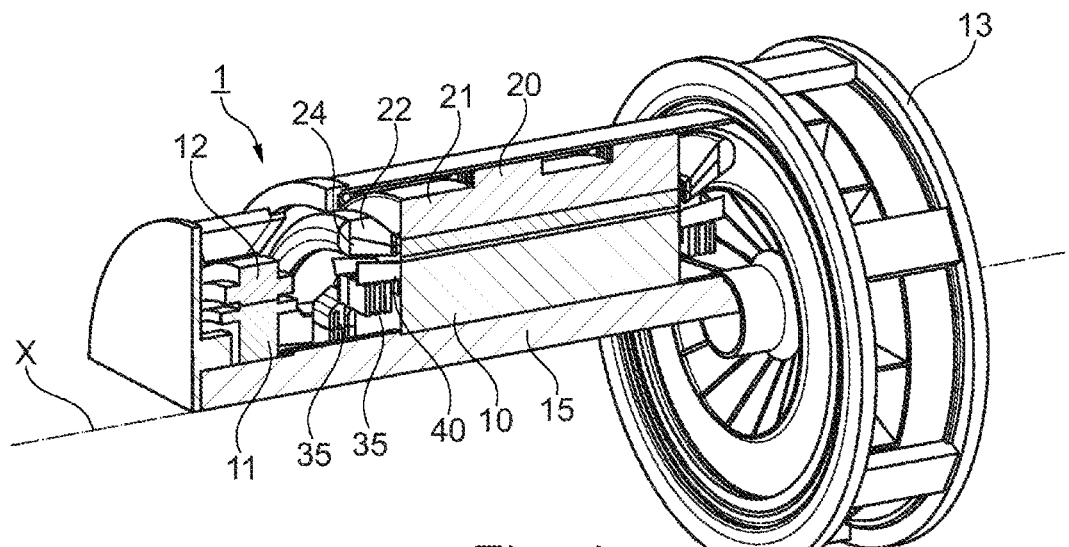
FIG. 1 shows, schematically and in perspective, with a partial longitudinal section, an example of a rotating machine according to the invention.

The electrical rotating machine 1 according to the invention, shown partially in FIG. 1, is an alternator.

The machine comprises a main pole piece 10, rotating with the rotor, a main stator 20, and an exciter comprising an exciter armature 11 and an exciter field winding 12, in a conventional way.

The rotor rotates around an axis of rotation X with a shaft 15 driving a fan 13, also called a turbine, which generates an axial cooling air flow through the machine. The fan 13 is preferably a double-channel fan, for example a centrifugal or mixed-flow fan, positioned, for example, on the rotor at the opposite end from the exciter 11, as illustrated.

Figure 3:
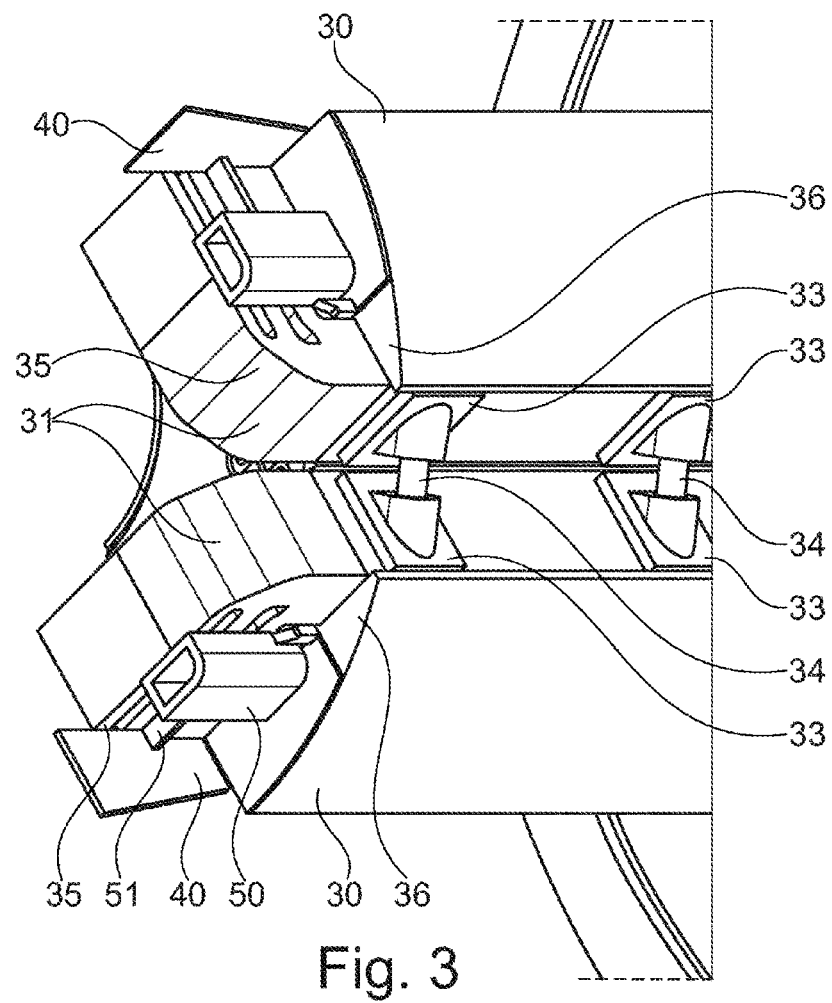
FIG. 3 is a perspective view showing a detail of embodiment of the rotor.
Figure 4:
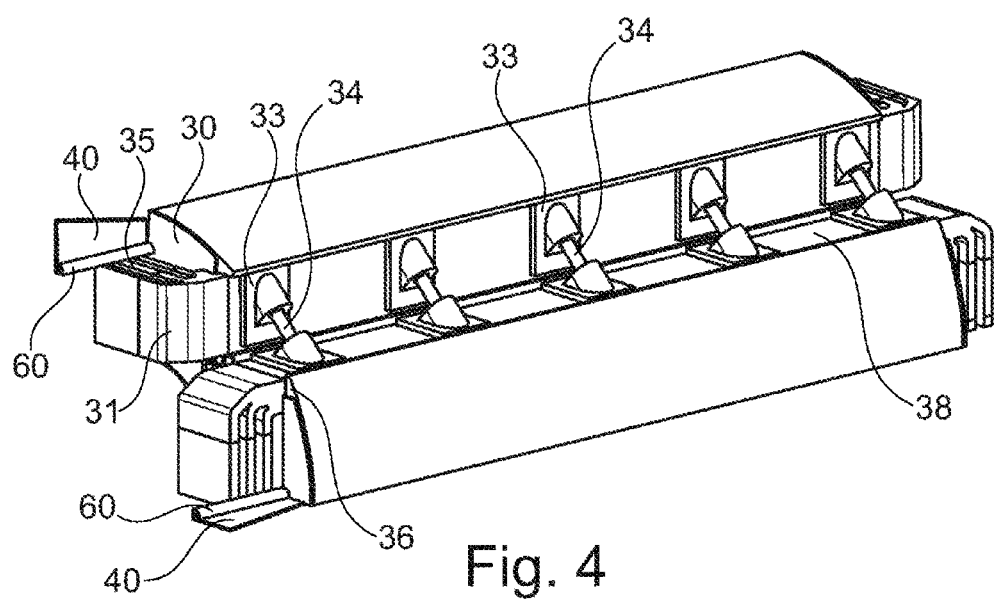
FIG. 4 shows a variant embodiment.

If reference is made to FIGS. 3 and 4, it will be seen that the rotor comprises poles 30 formed by stacks of magnetic plates, on which conductors 31 are wound. The latter are arranged in the form of windings which have straight parts extending along the axis of rotation X and kept pressed against the stack of plates of the corresponding pole by chocks 33 and clamping screws 34, and winding heads 35 which extend axially beyond the corresponding stack of plates.

The poles 30 may be made with pole shoes 36 which help to retain the windings 31 on the rotor against the action of centrifugal force.

The inter-pole channels 38 may receive any additional cooling device, as described in the application FR2940867.

The stator 20 comprises a stack of plates 21 on which windings 22 are wound.

The invention is applicable to different types of stator. It should be noted, however, that the invention is found to have the best performance and the greatest usefulness with "random wound stators" (as they are known in English). The invention also covers machines with stator windings known as "form wound".

The stator winding 22 forms winding heads 24 which at least partially overlap those of the rotor axially, as may be seen, notably, in FIG. 1.

According to the invention, the rotor is equipped with cooling fins 40 which are intended to project an additional cooling air flow onto the stator. These cooling fins 40 are, for example, four in number, as illustrated, that is to say one for each pole at each end of the main inductor of the rotor, in the example considered.

The fins 40 extend in prolongation of the stack of rotor plates at each pole.

The fins 40 may extend in the radial direction beyond the cylindrical envelope defined by the poles of the rotor, benefiting from the fact that they are located outside the air gap in an area where they face only the winding heads 22 of the stator and not the magnetic circuit of the latter which is defined by the stack of stator plates.

Figure 2:
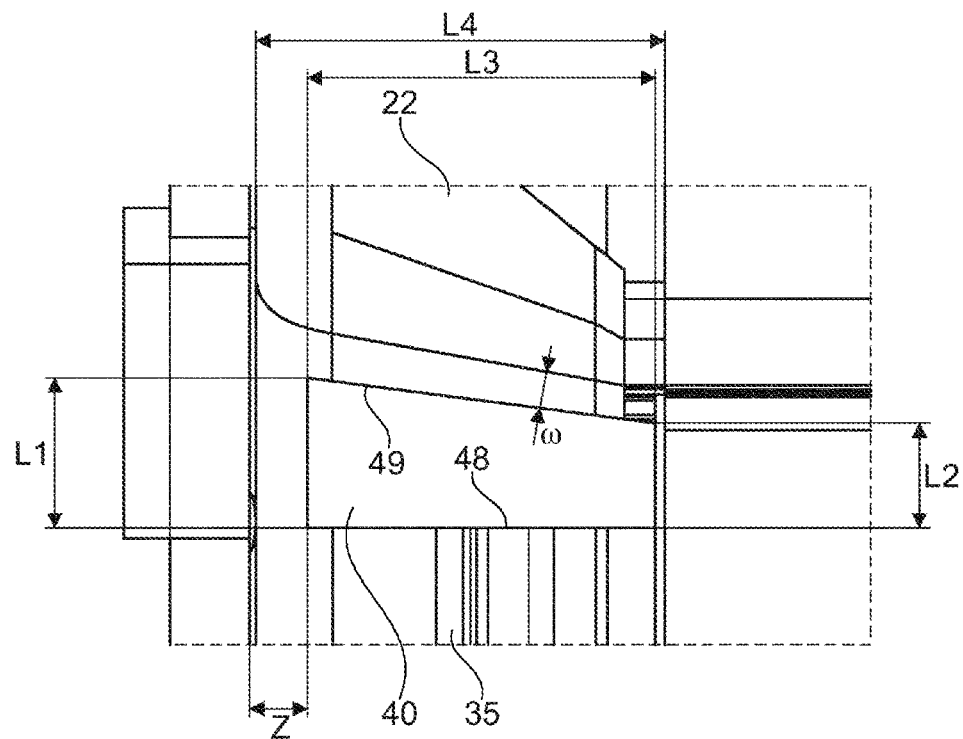
FIG. 2 shows a cooling fin in isolation.

The fins 40 may be made in various shapes, for example, as shown in FIG. 2, a shape in which their radial dimension increases from a value L2 at their base where they are attached to the stack of plates of the corresponding pole, to a value L1 at their distal edge, considered in terms of progression along the axis of rotation of the rotor.

The length L3 of a fin 40 may be such that it extends axially beyond the adjacent winding head 35. The length L3 is, for example, between 0% and 150% of the length L4 of a stator winding head, the lengths L3 and L4 being measured on the axis X. Each fin 40 preferably extends axially at a distance from the stator winding head 22, as may be seen in FIG. 2.

The fins 40 may have a radially inner edge 48 parallel to the axis of rotation X and a radially outer edge 49 extending radially outward as its distance from the stack of plates of the corresponding pole increases.

The distance w between the radially outer edge 49 and the enveloping surface of the winding heads 22 of the facing stator may be substantially constant, as shown in FIG. 2. It may be different from this. This is because the fins 40 may have a shape such that the distance w is not constant between the radially outer edge 49 and the enveloping surface of the winding heads 22 of the facing stator.

In the illustrated example, the rotor comprises 4 poles with one fin 40 per pole and 4 cooling fins on either side of the main inductor, that is to say 8 cooling fins altogether. However, the invention is not limited to any particular number of cooling fins, the number being, for example, between 1 and 200 per pole, on at least one side of the rotor.

The fins 40 may be fastened to the rotor in various ways.

It is possible, for example, to make use of the presence of an implement or winding part, used to wind the conductors of a pole of the rotor, to keep a cooling fin 40 in place on the rotor, as shown in FIG. 3. This implement serves, for example, to keep the rotor windings separated at the winding heads 35, to provide ventilation for them and facilitate their cooling.

FIG. 3 shows a fastening part 50 which is attached to a corresponding winding head 35 and which holds the fin 40 by means of an arm 51. The fastening part 50 is fastened, for example, to the rotor 10 by means of the pole shoes 36, or by brackets on the winding heads, and/or on the winding of the main inductor 10, enabling the fastening part 50 to be trapped and held in the machine when the rotor 10 is in rotation.

In a variant, shown in FIG. 4, the fins 40 are held by support rods 60, each of which is fastened in the stack of plates of the corresponding pole. For example, each rod 60 extends into a drilled hole formed in the stack of plates.

The fins 40 may be fastened in yet other ways to the rotor, being, for example, bonded on to the rotor, for example on the winding heads and/or on the stack of plates, and/or screwed onto the guard plates or main plates. When the fins are fastened to the stack of plates, they may be welded or snap-fitted onto it.

The cooling fins 40 may also be formed directly together with an end part of the rotor, which serves, for example, to keep the stack of plates compressed.

During the operation of the machine, the fins 40 act as a kind of radial fan. Air is drawn in by the pressure drop, because of the rotation of the fins, and the fins generate an air flow in the radial direction toward the stator winding heads. This air flow generated by the cooling fins 40 because of the rotation of the rotor provides a higher heat transfer coefficient at the stator winding, which may cause a decrease in the hot spots that may appear, notably at the winding heads of this winding. This results in a lower average temperature of the stator windings.

The cooling fins may also play a lesser, but not negligible, part in cooling the rotor. This is because the suction created at the cooling fins 40 may, in some cases, improve the air flow at the radial ventilation passages of the main pole piece 10.

The invention is not limited to the examples described above.

The shape and/or number of fins, and/or the way of holding them on the rotor, may be further modified. Each cooling fin may be contained in a single plane in geometrical terms, as shown in FIG. 2, but this is not essential. It is possible to have inclined shapes which are continuous or discontinuous in part, or to have any combination of cooling fins, each with a different shape.

The invention claimed is:

1. A rotor of an electrical rotating machine comprising:
   poles formed from stacks of magnetic plates,
   electrical conductors wound around each pole and forming winding heads,
   implements used during the winding of the electrical conductors of each pole to keep the electrical conductors spaced apart at the winding head and forming ventilation passages for the winding head,
   cooling fins extending in prolongation of the poles along the axis of rotation of the rotor,
   wherein the rotor comprising arms connecting the cooling fins to the implements.

2. The rotor of the electrical rotating machine as claimed in claim 1, the fins defining a largest diameter for the rotor.

3. The rotor of the electrical rotating machine as claimed in claim 1, the fins each having a radial dimension that increases with distance from the corresponding pole.

4. The rotor of the electrical rotating machine as claimed in claim 3, the fins having a radially inner edge parallel to the axis of rotation and a radially outer edge extending radially outward as its distance from the corresponding pole increases.

5. The rotor of the electrical rotating machine as claimed in claim 1, the fins each having a radial dimension that decreases with distance from the corresponding pole.

6. The rotor of the electrical rotating machine as claimed in claim 5, the fins having a radially inner edge parallel to the axis of rotation and a radially outer edge extending radially outward as it approaches the corresponding pole.

7. The rotor of the electrical rotating machine as claimed in claim 1, the distance between an edge of the fins and the stator winding heads being substantially constant.

8. An electrical rotating machine comprising a stator and a rotor as claimed in claim 1.

9. The electrical rotating machine as claimed in claim 8, the stator having winding heads, and the cooling fins extending axially from the poles less than the stator winding heads.

10. The rotor of the electrical rotating machine as claimed in claim 9, the fins being flat.

11. The electrical rotating machine as claimed in claim 8, the electrical rotating machine comprising an exciter and a fan positioned on the rotor at the opposite end from the exciter.

12. The electrical rotation machine as claimed in claim 11, the fins being positioned on either side of the rotor, the fins positioned on the rotor at the opposite end from the exciter being adjacent to the fan.

13. The machine as claimed in claim 12, the machine being an alternator.

14. The electrical rotation machine as claimed in claim 12, the fan being a centrifugal or mixed-flow fan.

15. The electrical rotation machine as claimed in claim 11, the fan being a double-channel fan.

16. The rotor of the electrical rotating machine as claimed in claim 1, the poles being made with pole shoes, the implements comprising fastening parts being fastened to the pole shoes.

17. The rotor of the electrical rotating machine as claimed in claim 1, each fin having a radial dimension that increases or decreases with distance from the corresponding pole.

* * * * *